US012158127B2

(12) United States Patent
Hatakeyama et al.

(10) Patent No.: US 12,158,127 B2
(45) Date of Patent: Dec. 3, 2024

(54) AIR CLEANER

(71) Applicant: TIGERS POLYMER CORPORATION, Osaka (JP)

(72) Inventors: Jun Hatakeyama, Hyogo (JP); Akihito Saka, Hyogo (JP)

(73) Assignee: TIGERS POLYMER CORPORATION, Osaka (JP)

( * ) Notice: Subject to any disclaimer, the term of this patent is extended or adjusted under 35 U.S.C. 154(b) by 206 days.

(21) Appl. No.: 17/933,645

(22) Filed: Sep. 20, 2022

(65) Prior Publication Data

US 2023/0287850 A1 Sep. 14, 2023

(30) Foreign Application Priority Data

Mar. 14, 2022 (JP) ................................ 2022-038775

(51) Int. Cl.
*F02M 35/024* (2006.01)

(52) U.S. Cl.
CPC ................. *F02M 35/02416* (2013.01); *F02M 35/02491* (2013.01)

(58) Field of Classification Search
CPC ....... F02M 35/02416; F02M 35/02491; F02M 35/0202; F02M 35/0201; F02M 35/02425; B01D 46/0002; B01D 46/0005; B01D 46/10; B01D 2201/605
See application file for complete search history.

(56) References Cited

U.S. PATENT DOCUMENTS 5,620,505 A * 4/1997 Koch ................. B01D 46/0036 55/497
7,341,613 B2 * 3/2008 Kirsch ................... B01D 29/07 55/497
7,959,700 B2 * 6/2011 Kidman ................. B01D 46/10 55/497
9,970,394 B2 * 5/2018 Merritt ............. F02M 35/02483
11,499,634 B1 * 11/2022 Pride ...................... B01D 27/08
2009/0056293 A1 * 3/2009 Styles .................. B01D 46/521 55/497
2013/0306018 A1 * 11/2013 von Krane ....... F02M 35/10144 123/184.21
2015/0204282 A1 * 7/2015 Merritt ............... B01D 46/0002 55/482
2016/0059172 A1 * 3/2016 Allott ................. B01D 46/0005 55/502
2021/0396427 A1 * 12/2021 Gorman ............... B01D 46/001

FOREIGN PATENT DOCUMENTS

JP 2013-231387 A 11/2013

* cited by examiner

*Primary Examiner* — Grant Moubry
(74) *Attorney, Agent, or Firm* — Pearne & Gordon LLP

(57) ABSTRACT

Provided is an air cleaner including: a first case and a second case each having a case wall; and a flat plate filter element sandwiched between the first case and the second case, wherein the flat plate filter element has an annular sealing portion on a peripheral edge of the flat plate filter element, at least a partial section of a peripheral edge of at least one of the first case or the second case has a flange portion and a guide wall inside the case wall, the flange portion contacts the sealing portion and extends inside at least one of the first case or the second case substantially perpendicular to the case wall from an end of the case wall, and the guide wall extends substantially parallel to the case wall and facing the case wall from an inner end of the flange portion.

5 Claims, 4 Drawing Sheets

AIR CLEANER

CROSS-REFERENCE TO RELATED APPLICATION

This application claims priority from Japanese Patent Application No. 2022-038775 filed with the Japan Patent Office on Mar. 14, 2022, the entire contents of which is hereby incorporated by reference.

BACKGROUND

1. Technical Field

The present disclosure relates to an air cleaner.

2. Related Art

The air cleaner is used to filter and purify the air supplied to an internal combustion engine, the air supplied to a fuel cell, the air serving as cooling air, or the like. In automobiles and the like, the air cleaner including a flat plate filter element is widely used.

The flat plate filter element is typically sandwiched between upper and lower cases of the air cleaner. The air passing through an inside of the air cleaner is filtered by the filter element. Usually, a sealing material is provided in an annular shape on a peripheral edge of the filter element. The sealing material seals between the case and the filter element to prevent contaminated air from entering from the outside.

For example, in the technique disclosed in JP-A-2013-231387, the filter element of the air cleaner is configured to be sandwiched between a flange of a first case having an inlet and a flange of a second case having an outlet, in an outer peripheral frame portion of a filter material. Further, it is disclosed that an adsorption sheet for adsorbing evaporative fuel gas is attached to a downstream side of an air flow in the filter material. The air cleaner disclosed in JP-A-2013-231387 can easily assemble the filter and the adsorption sheet to the case of the air cleaner.

SUMMARY

An air cleaner according to an embodiment of the present disclosure is configured as follows. The air cleaner includes: a first case and a second case each having a case wall; and a flat plate filter element sandwiched between the first case and the second case. The flat plate filter element has an annular sealing portion on a peripheral edge of the flat plate filter element. At least a partial section of a peripheral edge of at least one of the first case or the second case has a flange portion and a guide wall inside the case wall of at least one of the first case or the second case. The flange portion contacts the sealing portion. The flange portion extends inside at least one of the first case or the second case from an end of the case wall. The flange portion extends substantially perpendicular to the case wall, in an extending direction of the flat plate filter element. The guide wall extends from an inner end of the flange portion, substantially parallel to the case wall. The guide wall extends in a direction perpendicular to the extending direction of the flat plate filter element, and facing the case wall.

DETAILED DESCRIPTION

Figure 1:
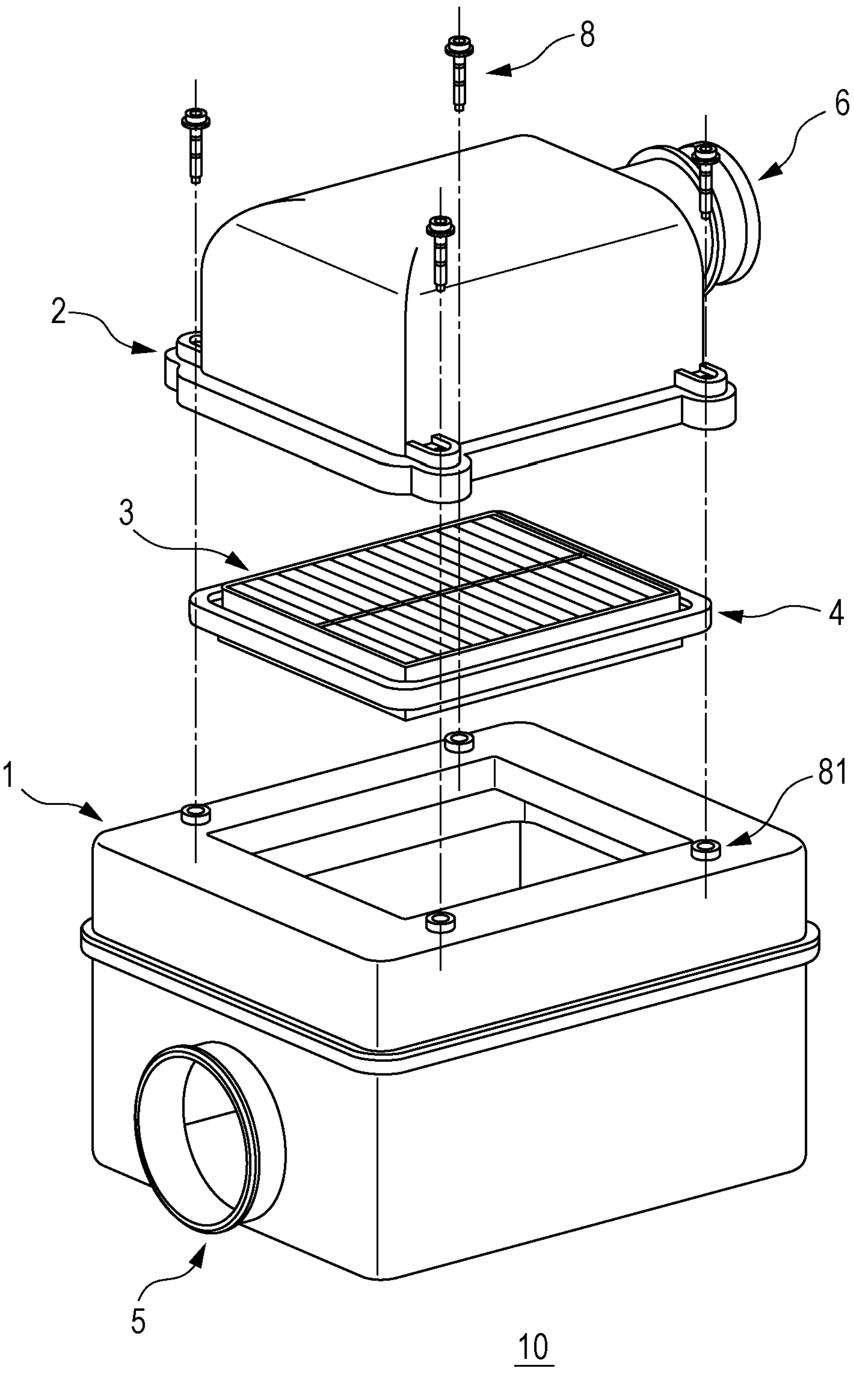
FIG. 1 is an exploded perspective view illustrating a configuration of an air cleaner of a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

By the way, in an air cleaner of JP-A-2013-231387, a flange of a first case and a flange of a second case are respectively provided to project outwardly of cases from case walls. Hereinafter, in the present specification, such a structure may be referred to as an “outer flange type” structure. That is, in the air cleaner having the outer flange type structure as described in JP-A-2013-231387, the flange projects outwardly from the case wall of the air cleaner.

In recent years, a space for providing the air cleaner has been increasingly limited, especially in vehicles and the like. Reasons for this include, for example, motor generators and batteries of hybrid vehicles, and engines or complex systems such as power supply system having been installed in the vehicles. The air cleaner is required to be provided avoiding other parts or members placed near the air cleaner. On the other hand, capacity of the air cleaner is required to be as large as possible in order to regulate flow of air passing through an inside of the air cleaner and to improve sound deadening qualities of an intake path through which the air passes.

An object of the present disclosure is to provide the air cleaner whose capacity can be easily increased. In addition, another object of the present disclosure is to effectively increase rigidity of the flange.

As a result of diligent studies, the inventors have found that in the conventional outer flange type air cleaner, since the flange is provided outwardly from the case wall, the case wall is provided at a position inside by a predetermined distance from an outer edge of the flange. Then, the inventors have found that it is possible to increase the capacity of the air cleaner by providing a flange and a guide wall inside from an end of the case wall and by configuring a cross-section of the case wall, the flange, and the guide wall to be a substantially U-shaped cross-section, and have completed the technology of the present disclosure.

An air cleaner according to a first aspect of the present disclosure includes: a first case and a second case each having a case wall; and a flat plate filter element sandwiched between the first case and the second case. The flat plate filter element has an annular sealing portion on a peripheral edge of the flat plate filter element. At least a partial section of a peripheral edge of at least one of the first case or the second case has a flange portion and a guide wall inside the case wall of at least one of the first case or the second case. The flange portion contacts the sealing portion. The flange portion extends inside at least one of the first case or the second case from an end of the case wall. The flange portion extends substantially perpendicular to the case wall, in an extending direction of the flat plate filter element. The guide wall extends from an inner end of the flange portion, substantially parallel to the case wall. The guide wall extends in a direction perpendicular to the extending direction of the flat plate filter element, and facing the case wall.

In the present specification, such a structure in which the flange portion and the guide wall are provided inwardly of the case from the end of the case wall may be referred to as an "inner flange type" structure. In the inner flange type structure of the present specification, the cross-section of the case wall, the flange portion, and the guide wall is a substantially U-shaped cross-section.

In the first aspect, preferably, an outer shape of the sealing portion has a polygonal shape having a plurality of sides forming the polygonal shape when viewed along the direction perpendicular to the extending direction of the flat plate filter element, and the flange portion and the guide wall are provided across positions corresponding to at least one side and parts of two sides each adjacent to the one side, at the peripheral edge of at least one of the first case or the second case (a second aspect).

Moreover, in the first aspect, preferably, the peripheral edge of at least one of the first case or the second case has the flange portion and the guide wall over an entire circumference of the peripheral edge (a third aspect).

Moreover, in the first aspect, preferably, the case wall and the guide wall are connected to each other by a rib in at least one of the first case or the second case (a fourth aspect).

Moreover, in the first aspect, preferably, the first case includes a first divided body and a second divided body which are obtained by dividing the first case substantially parallel to the extending direction of the flat plate filter element (a fifth aspect).

Moreover, in the first aspect, preferably, a portion in which a width of the flange portion is larger than that of the sealing portion is provided in at least a partial section of the peripheral edge of at least one of the first case or the second case, and the flange portion includes a plurality of portions having different widths (a sixth aspect).

With the air cleaner according to the first aspect of the present disclosure, the capacity of the air cleaner is increased. Moreover, in the case of the air cleaner according to the sixth aspect, the capacity of the air cleaner is particularly increased.

Further, in the case of the air cleaner according to the second aspect, the third aspect, or the fourth aspect, it is possible to further effectively increase the rigidity of the flange.

Furthermore, in the case of the air cleaner according to the fifth aspect, it is possible to easily manufacture the air cleaner.

Hereinafter, embodiments of the present disclosure will be described with reference to the drawings, taking an example of the air cleaner that filters the air supplied to an internal combustion engine of an automobile. The technology of the present disclosure is not limited to the individual embodiments described below, and can be implemented by modifying the following embodiments.

FIG. 1 is an exploded perspective view illustrating a configuration of an air cleaner 10 of a first embodiment.

The air cleaner 10 has a first case 1, a second case 2, and a flat plate filter element 3. The flat filter element 3 is sandwiched between the first case 1 and the second case 2. An internal space of a hollow box-shaped air cleaner case, which is formed by the first case 1 and the second case 2, is divided by the flat plate filter element 3.

In the following description, the flat plate filter element 3 may be simply referred to as the filter element 3.

An inlet 5 is provided in the first case 1 and an outlet 6 is provided in the second case 2. The air cleaner 10 is provided in the intake path of the internal combustion engine. A duct member and the like that configures the intake path of the internal combustion engine is connected to the inlet 5 and the outlet 6. The air enters the air cleaner 10 from the inlet 5 and flows out from the outlet 6. The air passing through the air cleaner 10 is filtered by the filter element 3. The first case 1 and the second case 2 are typically, but not necessarily, made of a thermoplastic resin (for example, polypropylene resin).

Figure 2:
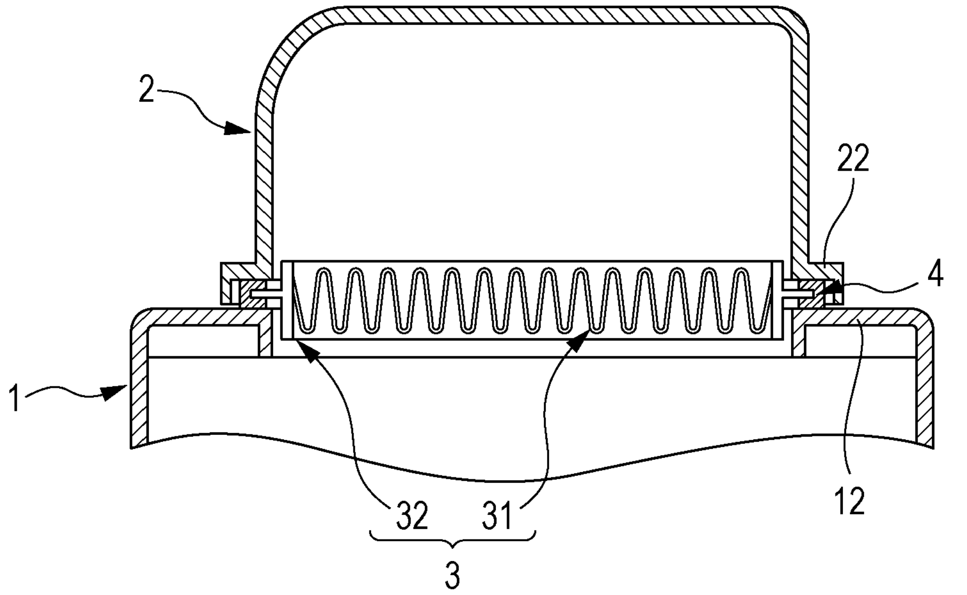
FIG. 2 is a cross-sectional view around a sealing portion of the air cleaner of the first embodiment.

FIG. 2 is a cross-sectional view around the sealing portion 4 of the air cleaner 10 of the first embodiment.

The flat plate filter element 3 has an annular sealing portion 4 on its peripheral edge. The sealing portion 4 prevents external air from entering the air cleaner 10 and prevents air that has not been filtered by the filter element 3 from passing through the air cleaner 10. The sealing portion 4 is made of rubber, foamed resin, nonwoven fabric, or the like. In the present embodiment, the filter element 3 is configured by integrating a pleated nonwoven fabric filter material 31 with a synthetic resin frame 32. The filter material is not limited to the nonwoven fabric, and may be filter paper, foamed resin (sponge), or the like. In the present embodiment, the peripheral edge of the frame 32 is provided with a flange-shaped projecting portion toward the outside, and the rubber sealing portion 4 is integrated with the projecting portion.

The annular sealing portion 4 is sandwiched between the first case 1 and the second case 2. A peripheral edge of the first case 1 is provided with an annular flange portion 12 and an annular guide wall 13. The annular flange portion 12 contacts the sealing portion 4. The annular guide wall 13 is connected to the annular flange portion 12. Further, a peripheral edge of the second case 2 is provided with an annular flange portion 22 that contacts the sealing portion 4.

The annular sealing portion 4 is sandwiched between the flange portion 12 of the first case 1 and the flange portion 22 of the second case 2, and sealing is completed between the sealing portion 4 and the flange portions 12 and 22. Note that an overall shape of the annular sealing portion 4, that is, an outer shape of the annular sealing portion 4, may be provided in a rectangular or quadrangular shape, or may have other shapes such as other polygonal shapes, circular shapes, elliptical shapes, and oval shapes, when viewed along a direction perpendicular to the extending direction of the flat plate filter element, that is, in a plan view.

Note that it is not essential that the first case 1 and the second case 2 respectively have the flange portion 12 and the flange portion 22 as in the present embodiment. At least one of the first case 1 and the second case 2 is only required to have the corresponding flange portion 12 or 22 that contacts the sealing portion 4. Typically, it is preferable to provide the flange portion in a case (the second case 2 in the present embodiment) on a downstream side, a so-called clean side case. That is, in the present embodiment, it is preferred that the seal is formed between the sealing portion 4 and the flange portion 22 provided on the second case 2 on the downstream side. Further, in the present embodiment, the case on the downstream side is the second case 2, but the case on the downstream side may be the first case 1.

In addition, in the present embodiment, the peripheral edge of the first case 1, specifically, the peripheral edge of the first case 1 including the flange portion 12 that contacts the sealing portion 4 has the inner flange type structure, and the peripheral edge of the second case 2, specifically, the peripheral edge of the second case 2 including the flange portion 22 that contacts the sealing portion 4 has the outer flange type structure. However, the peripheral edge of the first case 1 may have the outer flange type structure and the peripheral edge of the second case 2 may have the inner flange type structure. Furthermore, both the peripheral edge of the first case 1 and the peripheral edge of the second case 2 may have the inner flange type structure.

Figure 3:
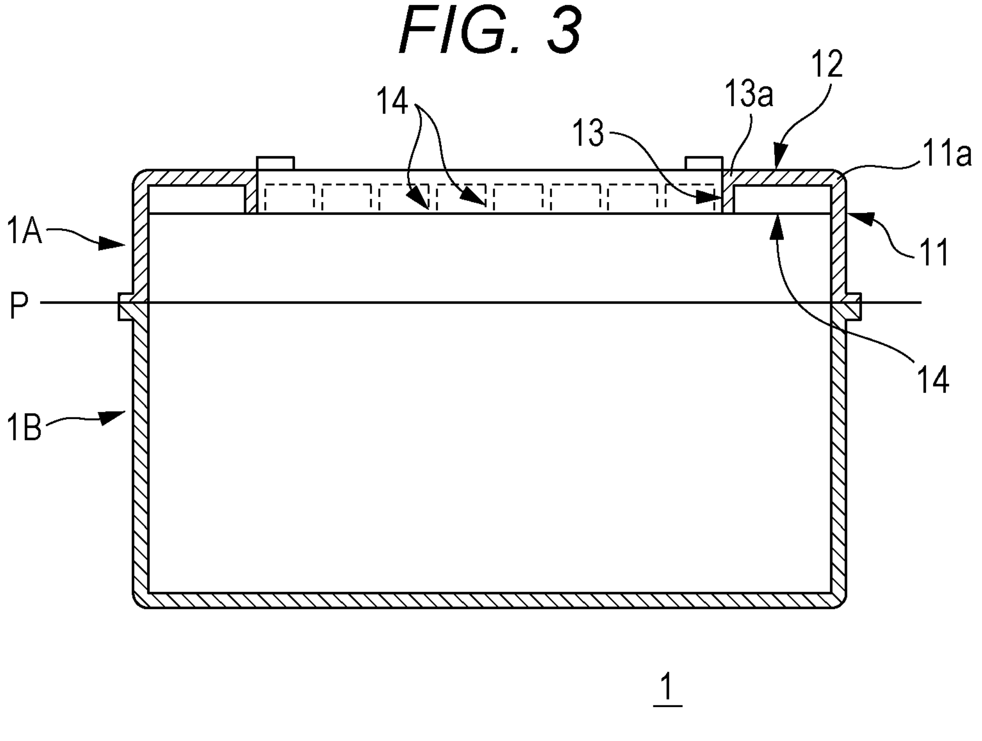
FIG. 3 is a cross-sectional view of a first case of the air cleaner of the first embodiment.

In the air cleaner 10 of the first embodiment, the peripheral edge of the first case 1 including the flange portion 12 has the inner flange type structure. The inner flange type structure at the peripheral edge of the first case 1 will be described in detail below with reference to FIGS. 2 and 3. FIG. 3 is a cross-sectional view of the first case 1 of the air cleaner 10 of the first embodiment.

The flange portion 12 of the first case 1 is provided to extend inwardly of the first case 1 from an end 11*a* of a case wall 11, in the extending direction of the flat plate filter element 3. The flange portion 12 and the sealing portion 4 contact each other, so the sealing is completed between the flange portion 12 and the sealing portion 4. The case wall 11 is a wall that separates the internal space from an external space of the air cleaner 10. The case wall 11 is formed in a shape of an open box in which a portion to which the filter element 3 is attached is open, and a portion corresponding to an open end edge is the end 11*a* of the case wall 11.

Further, the extending direction of the flat plate filter element 3 is a direction along a plane on which the sealing portion 4 extends annularly, and is a left-right direction and a depth direction of the drawings in FIGS. 2 and 3.

A width of the flange portion 12 is at least set to a width such that the flange portion 12 contacts the sealing portion 4 so that the sealing is properly completed. The width of the flange portion 12 may be constant over the whole circumference of the peripheral edge of the first case 1, or may be variable instead of being constant. That is, the flange portion 12 may have a plurality of different widths in the circumferential direction of the peripheral edge of the first case 1. Further, the flange portion 12 may include a plurality of portions having different widths in at least a partial section of the peripheral edge of at least one of the first case 1 and the second case.

Further, a portion of the flange portion 12 that contacts the sealing portion 4 may or may not be a plane. For example, the portion of the flange portion 12 that contacts the sealing portion 4 may be appropriately provided with a groove or projection along the circumferential direction.

As illustrated in FIGS. 2 and 3, an outer end of the flange portion 12 is connected to the end 11*a* of the case wall 11 and the flange portion 12 extends inwardly of the first case 1. Specifically, the flange portion 12 is provided to extend inwardly of the first case 1, from the end 11*a* of the case wall 11. The flange portion 12 extends substantially perpendicularly to the case wall 11, in the extending direction of the flat plate filter element 3.

Further, an end of the flange portion 12 in an inner direction of the first case 1, that is, an inner end of the flange portion 12 is connected to an end 13*a* of the annular guide wall 13. That is, the guide wall 13 is provided to extend in a direction perpendicular to the extending direction of the flat plate filter element 3, from an end of an inner peripheral side of the flange portion 12 with respect to the extending direction of the flange portion 12. The guide wall 13 is substantially parallel to the case wall 11 and facing the case wall 11.

Here, the direction perpendicular to the extending direction of the flat plate filter element 3 is an up-down direction in FIGS. 2 and 3, and can also be referred to as a thickness direction of the flat plate filter element 3. The guide wall 13 may be provided in a form to position the filter element 3 or to restrain the filter element 3 from dropping off, or may be provided in a form to serve as an air guide plate.

As illustrated in FIGS. 2 and 3, in the present embodiment, the cross-section of the case wall 11, the flange portion 12, and the guide wall 13 is configured to be a substantially U-shaped cross-section. In FIGS. 2 and 3, the guide wall 13 is provided to extend downwardly of the first case 1 from the end 13*a* connected to the inner end of the flange portion 12.

Thus, in the present embodiment, the peripheral edge of the first case 1 has the "inner flange type" structure.

Figure 4:
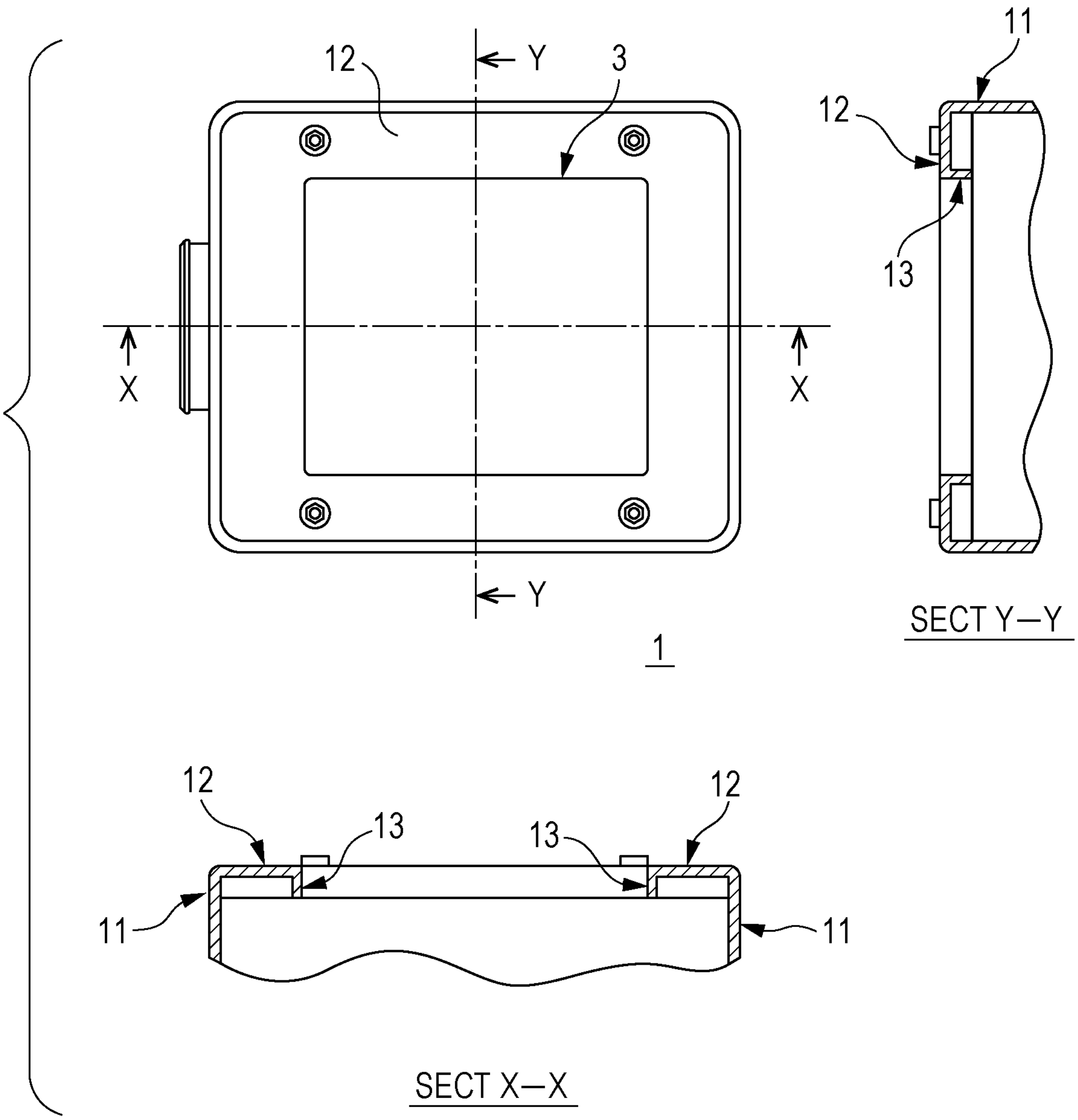
FIG. 4 is a plan view and a cross-sectional view of the first case of the air cleaner of the first embodiment.

FIG. 4 is a plan view and a cross-sectional view of the first case 1 of the air cleaner 10 of the first embodiment. The upper left view of FIG. 4 is a plan view of the first case 1 viewed from an upper surface side. The lower left view of FIG. 4 is a cross-sectional view taken along a line X-X. The upper right view of FIG. 4 is a cross-sectional view taken along a line Y-Y.

In the air cleaner 10 of the first embodiment, as illustrated in FIG. 4, the peripheral edge of the first case 1 is provided with the case wall 11, the flange portion 12, and the guide wall 13 in the inner flange type structure over an entire circumference of the peripheral edge. As in the air cleaner 10 of the present embodiment, it is preferred that a section having the inner flange type structure extends over the entire circumference when viewed along the direction perpendicular to the extending direction of the flat plate filter element 3.

However, it is not essential to provide the case wall 11, the flange portion 12, and the guide wall 13 in the inner flange type structure over the entire circumference of the peripheral edge of the first case 1. In at least a partial section of the peripheral edge of the first case 1, the case wall 11, the flange portion 12, and the guide wall 13 are only required to be provided to have the inner flange type structure.

In addition, although not essential, it is preferred that the case wall 11, the flange portion 12 and the guide wall 13 are provided to have the inner flange type structure in at least a partial section of the peripheral edge of each of the first case and the second case.

It should be noted that the case of "when viewed along the direction perpendicular to the extending direction of the flat plate filter element 3" can also be referred to as the case of the plan view, such as the upper left plan view of FIG. 4.

Further, although not essential, in the air cleaner 10 of the first embodiment, the case wall 11 and the guide wall 13 are connected to each other by ribs 14. As illustrated in FIG. 3, it is particularly preferred that the ribs 14 are provided to extend substantially perpendicular to the case wall 11 and the guide wall 13 and in the up-down direction in FIG. 3.

Although not essential, in the air cleaner 10 of the first embodiment, the first case 1 includes two divided bodies, that is, a first divided body 1A and a second divided body 1B. The first divided body 1A and the second divided body 1B are formed in a shape obtained by dividing the first case 1 with a dividing plane P substantially parallel to the extending direction of the flat plate filter element 3 (see FIG. 3). The first case 1 is formed by assembling the first divided body 1A and the second divided body 1B after preparing the first divided body 1A and the second divided body 1B in advance. More specifically, the first case 1 is formed by integrating the first divided body 1A and the second divided body 1B by joining. It should be noted that the dividing plane P need not be strictly parallel to the extending direction of the flat plate filter element 3, and is only required to be approximately parallel. Moreover, the dividing plane P may be a flat surface, a cylindrical surface, or a bent surface.

The air cleaner 10 of the first embodiment can be manufactured by applying a known manufacturing method.

The filter element 3 and the sealing portion 4 are manufactured and assembled by a known manufacturing method. The first case 1 and the second case 2 are typically manufactured by injection molding or the like of the thermoplastic resin. In order to integrally mold the flange portion 12 and the guide wall 13 together with the case wall 11, a slide mold and a setting core may be used as appropriate.

Further, when the first case 1 is integrally formed by joining the first divided body 1A and the second divided body 1B as in the air cleaner 10 of the present embodiment, the first case 1 may be manufactured by manufacturing each of the first divided body 1A and the second divided body 1B by injection molding of the thermoplastic resin and then joining them together by welding (for example, hot plate welding or vibration welding). Integration of the first divided body 1A and the second divided body 1B by joining may use an adhesive, a pressure sensitive adhesive, or a locking structure (snap fit).

The air cleaner 10 is completed by assembling the filter element 3 between the first case 1 and the second case 2 manufactured as described above. For example, fastening members such as bolts 8 and nuts 81 (see FIG. 1), and a clip member, a locking member, a band (not illustrated), or the like may be used so that the filter element 3 and the sealing portion 4 are securely sandwiched between the first case 1 and the second case 2. Note that in FIGS. 1 to 3, illustrations of mounting holes, seating surfaces, the nuts 81, or the like related to the bolts 8 may be omitted.

Operations and effects of the air cleaner 10 of the first embodiment will be described. In at least a partial section of the peripheral edge of the first case 1 of the air cleaner 10, the case wall 11, the flange portion 12, and the guide wall 13 are provided to have the inner flange type structure. The flange portion 12 is provided substantially perpendicular to the case wall 11 so as to extend inwardly of the first case 1 in the extending direction of the flat plate filter element 3 from the end 11*a* of the case wall 11. At the same time, the guide wall 13 is provided to extend from the end 13*a* of the guide wall 13, which is connected to an inner end of the flange portion 12, so as to face the case wall 11 substantially in parallel in the direction (the up-down direction in FIGS. 2 and 3) perpendicular to the extending direction of the flat plate filter element 3. Thus, the cross-section of the case wall 11, the flange portion 12, and the guide wall 13 is configured to be a substantially U-shaped cross-section. Therefore, the capacity of the air cleaner 10 is increased.

Since the conventional air cleaner disclosed in JP-A-2013-231387 has the outer flange type structure, the case wall is erected inside the flange portion. In this case, even if the flange portion is provided as far outside as possible, the case wall is located inside the flange portion by the width of the flange portion to be brought into contact with the sealing portion. Therefore, the capacity of the air cleaner is inevitably reduced by the width of the flange portion. Reduction in the air cleaner capacity tends to cause deterioration in noise reduction performance, deterioration in airflow resistance, reduction in filtration performance, and the like.

According to the air cleaner 10 of the first embodiment, the capacity of the air cleaner 10 can be increased because the case wall 11 can be disposed outside the flange portion 12 in the section having the inner flange type structure.

In addition, from the viewpoint of ease of manufacture, the flat plate filter element 3 is often formed such that the filter material 31 portion is rectangular (rectangular parallelepiped in three-dimensional shape) in a plan view. Therefore, the sealing portion 4 is also often provided in a quadrangular shape (especially in a rectangular shape) when viewed along the direction perpendicular to the extending direction of the flat plate filter element, that is, in a plan view.

In this case, in the air cleaner having the outer flange type structure according to the related art, the position of the case wall and the capacity of the air cleaner are limited by an inner shape of the flange portion corresponding to the rectangular sealing portion. On the other hand, in the air cleaner 10 having the inner flange type structure according to the first embodiment, only an arrangement of the guide wall 13 is limited by the rectangular sealing portion, and the width of the flange portion 12 and the position of the case wall 11 is not limited by the rectangular sealing portion 4. That is, the case wall 11 can be provided to bulge to a maximum extent allowed by layout around the case wall 11 without being limited by the shape of the sealing portion 4, so that the capacity of the air cleaner 10 can be increased.

Further, in the air cleaner 10 of the first embodiment, since the cross-section of the case wall 11, the flange portion 12, and the guide wall 13 are configured to be a substantially U-shaped cross-section, it is possible to restrain elastic deformation of the flange portion 12 in the direction perpendicular to the extending direction of the flat plate filter element 3. Therefore, sealing performance can be improved.

In particular, as in the air cleaner 10 of the first embodiment, when a section in which the flange portion 12 is provided in the inner flange type extends over the entire circumference when viewed along the direction perpendicular to the extending direction of the flat plate filter element 3, the guide wall 13 is provided in a tubular shape continuously in the circumferential direction, and the case wall 11, the flange portion 12, and the guide wall 13 work like an integrated shell structure. Therefore, the elastic deformation of the flange portion 12 in the direction perpendicular to the extending direction of the flat plate filter element 3 is more effectively restrained. That is, the rigidity of the flange portion 12 can be effectively increased.

Further, although not essential, in the air cleaner 10 of the first embodiment, the case wall 11 and the guide wall 13 are connected to each other by the ribs 14. In such a case, relative displacement between the case wall 11 and the guide wall 13 in the direction perpendicular to the extending direction of the flat plate filter element 3 is more reliably restrained. Therefore, the elastic deformation of the flange portion 12 is more effectively restrained, and the rigidity of the flange portion 12 is particularly effectively increased.

Further, although not essential, in the air cleaner 10 of the first embodiment, the first case 1 is formed by integrating the first divided body 1A and the second divided body 1B by joining. Further, the first divided body 1A and the second divided body 1B are formed in a shape obtained by dividing the first case 1 with the dividing plane P substantially parallel to the extending direction of the flat plate filter element 3. By employing such a configuration, a structure of the mold for manufacturing the first divided body 1A and the second divided body 1B by injection molding of the thermoplastic resin is simpler, so that the air cleaner 10 can be manufactured easier.

The aspects of the present disclosure are not limited to the first embodiment described above, and can be implemented with various modifications. A second embodiment of the present disclosure will be described below. In the following description, portions different from the first embodiment will be mainly described, and detailed descriptions of the same portions may be omitted. Moreover, these embodiments can be implemented by combining parts of them with each other or replacing a part of them.

In the first embodiment, referring to FIG. 4, an example has been described in which the case wall 11, the flange portion 12, and the guide wall 13 are provided in the inner flange type structure over the entire circumference of the peripheral edge of the first case 1 of the air cleaner 10. However, the inner flange type structure may be provided in at least a partial section of the peripheral edge of the first case 1. Hereinafter, as the second embodiment of the present disclosure, the air cleaner 10 having the inner flange type structure in a partial section of the peripheral edge of the first case 1 will be described.

Figure 5:
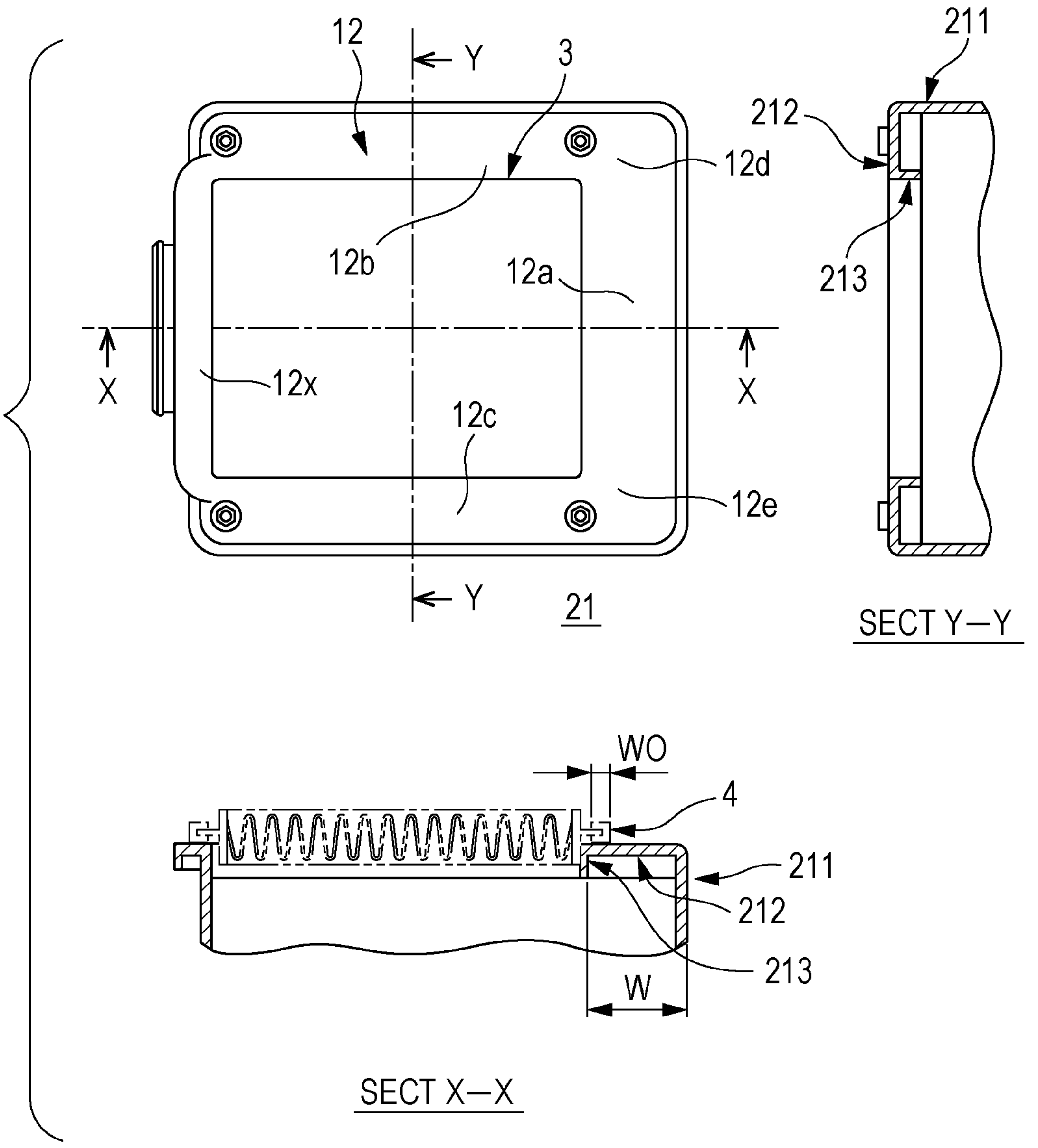
FIG. 5 is a plan view and a cross-sectional view of the first case of the air cleaner of a second embodiment.

FIG. 5 is a plan view and a cross-sectional view of a first case 21 of the air cleaner 10 of the second embodiment. The upper left view of FIG. 5 is a plan view of the first case 21 viewed from an upper surface side. The lower left view of FIG. 5 is a cross-sectional view taken along a line X-X. The upper right view of FIG. 5 is a cross-sectional view taken along a line Y-Y.

In the first case 21 of the second embodiment, out of four sides of the peripheral edge of the first case 21 surrounding the filter element 3 having a rectangular shape in a plan view, three sides have the inner flange type structure, and remaining one side has an outer flange type structure. That is, a left side 12*x* located on the left side in the plan view of FIG. 5 (in the upper left view of FIG. 5) has the outer flange type structure in which a case wall 211 is connected to an inside of a flange portion 212, and a guide wall 213 is connected to an outside of the flange portion 212. Further, a right side 12*a*, an upper side 12*b*, and a lower side 12*c*, which are located on the right side, the upper side, and the lower side in the plan view of FIG. 5 have the inner flange type structure in which the case wall 211 is connected to the outside of the flange portion 212, and the guide wall 213 is connected to the inside of the flange portion 212.

Also in the second embodiment, since the case wall 211 of the first case 21 is disposed outside the flange portion 212 in a portion having the inner flange type structure, the capacity of the air cleaner 10 is increased.

Further, in the air cleaner 10 according to this embodiment of the present disclosure, it is preferable to provide a portion in which a width W of the flange portion 212 is larger than a width WO of the sealing portion 4 in the portion having the inner flange type structure. The width W of the flange portion 212 is preferably twice or more the width WO of the sealing portion 4, and more preferably three times or more. When the width W of the flange portion 212 is large, the capacity of the air cleaner 10 can be further increased.

Further, the width W of the flange portion 212 may be constant in the circumferential direction as in the first embodiment illustrated in FIG. 4, or may be varied in the circumferential direction as in this embodiment illustrated in FIG. 5. That is, the flange portion 212 may include a plurality of portions having different widths W in the circumferential direction.

For example, in an example illustrated in the upper left view of FIG. 5, a width of the right side 12*a* is set larger than those of the upper side 12*b* and the lower side 12*c*. Note that a combination of different widths W of the flange portion 212 is not limited to this example, and can be appropriately set if necessary. For example, the width of the right side 12*a* may be set smaller than those of the upper side 12*b* and the lower side 12*c*. In addition, for example, the widths of the upper side 12*b* and the lower side 12*c* may be the same or different from each other.

The shape of the sealing portion 4 is likely to be limited by a shape of the filter element 3. However, by providing the inner flange type structure and setting the width W as described above, the flange portion 212 and the case wall 211 can be provided in a configuration that bulges outwardly of the case from the sealing portion 4. Therefore, the capacity of the air cleaner 10 can be further increased.

In addition, from the viewpoint of increasing the rigidity of the flange portion, in a case where the sealing portion 4 has a polygonal shape having a plurality of sides forming the polygonal shape, it is preferable to have a configuration in which the inner flange type structure is provided at positions corresponding to at least one side and parts of two sides each adjacent to the one side at the peripheral edge of the first case 21. Further, it is more preferable to have a configuration in which the inner flange type structure is provided across the positions corresponding to at least one side and parts of two sides each adjacent to the one side of the plurality of sides forming the polygonal shape of the sealing portion 4, at the peripheral edge of the first case 21.

For example, in the example illustrated in FIG. 5, the inner flange type structure is provided across the right side 12*a*, the upper side 12*b*, and the lower side 12*c*, which are three adjacent sides, at the peripheral edge of the first case 21.

Specifically, as illustrated in the upper left plan view of FIG. 5, the overall shape of the sealing portion 4, that is, an external shape of the sealing portion 4 preferably has a polygonal shape when viewed along the direction perpendicular to the extending direction of the flat plate filter element 3. Here, the polygonal shape is, but not limited to, for example, a quadrangular shape including a rectangular shape. For example, as illustrated in the upper left plan view of FIG. 5, if the outer shape of the sealing portion 4 in a plan view is rectangular, the peripheral edge of the first case 21 including the sealing portion 4 has four sides. Four corners of the rectangular shape may have a shape rounded as illustrated in the upper left plan view of FIG. 5.

In addition, a section in which the peripheral edge of the first case 21 including the flange portion 212 has the inner flange type structure is preferably provided to be substantially U-shaped when viewed along the direction perpendicular to the extending direction of the flat plate filter element 3. That is, it is preferred that the peripheral edge of the first case 21 having the inner flange type structure is provided to reach at least a part of two adjacent sides beyond corners of both ends of one side.

For example, in the upper left plan view of FIG. 5, a substantially U-shaped section is provided over three sides of the upper side 12*b*, the right side 12*a*, and the lower side 12*c* surrounding the filter element 3 having a rectangular shape, and the peripheral edge of the first case 21 in the substantially U-shaped section has the inner flange type structure. That is, the section having the inner flange type structure is provided to reach a part of the upper side 12*b* and the lower side 12*c* adjacent to the right side 12*a* beyond corners of both ends (an upper end 12*d* and a lower end 12*e*) of the right side 12*a*.

It should be noted that "the substantially U-shaped section" corresponds to a case where the outer shape of the sealing portion 4 in a plan view is rectangular. The shape of the section having the inner flange type structure in a plan view may change depending on the outer shape of the sealing portion 4 in a plan view.

With such a structure, the case wall 211, the flange portion 212, and the guide wall 213, which form a U-shaped cross-section of the inner flange type structure, are provided continuously over the three sides of the right side 12*a*, the upper side 12*b*, and the lower side 12*c*. Thus, the case wall 211 and the guide wall 213 are continuously provided in a double cylindrical shape with the flange portion 212 interposed therebetween over the three sides of the right side 12*a*, the upper side 12*b*, and the lower side 12*c*. Therefore, the case wall 211, the flange portion 212, and the guide wall 213 act like an integrated shell structure, and the elastic deformation of the flange portion 212 in the direction perpendicular to the extending direction of the flat plate filter element 3 is more effectively restrained. That is, the rigidity of the flange can be effectively increased.

Also in the air cleaner 10 according to this embodiment of the present disclosure, as in the first embodiment, both the peripheral edge of the first case 1 and the peripheral edge of the second case 2 may have the inner flange type structure.

In at least one of the first case 1 and the second case 2, an effect of increasing the capacity of the air cleaner 10 can be obtained by providing the flange portion and the guide wall in the inner flange type structure, over the entire circumference of the peripheral edge of the case or over a partial circumference of the peripheral edge.

Further, in the example of the air cleaner 10 of the first embodiment, although the inlet 5 is provided in the first case 1 and the first case 1 side has been described as a dust side (an upstream side), the second case 2 on the clean side (downstream side) provided with the outlet 6 may be regarded as the first case 1.

It should be noted that substantially parallel, substantially perpendicular, and substantially U-shaped described in the air cleaner 10 according to the embodiments of the present disclosure do not have to be strictly parallel, perpendicular, and U-shaped, respectively. These are only required to be substantially parallel, perpendicular, and U-shaped, as long as effects of the present disclosure can be obtained without departing from the gist of the present disclosure.

In the description of the air cleaner 10 according to the embodiments of the present disclosure, detailed description of details of the air cleaner 10, such as an opening and closing structure of the case, a mounting structure, and a fixing structure, has been omitted, but the structure and the like in the related art may be used for these.

Further, the air cleaner 10 according to the embodiments of the present disclosure may be integrated with a muffler such as a resonator to form a so-called module type air cleaner 10. Further, the air cleaner 10 can be appropriately provided with an air flow rate sensor, a fuel vapor adsorption filter, a blow-by passage, or the like.

The air cleaner 10 according to the embodiments of the present disclosure can also be applied to other technical fields other than an illustrated intake system of the internal combustion engine. That is, the air cleaner 10 may be an air cleaner for filtering the air supplied to an engine, a power device (for example, a jet engine, a steam engine, and a fuel cell) or the like other than the internal combustion engine. Further, the air cleaner 10 may be an air cleaner for filtering cooling air for cooling a battery or the like, or may be an air cleaner for filtering air passing through an air conditioner or a ventilation device.

The air cleaner 10 according to the embodiments of the present disclosure can be used, for example, for the intake system of the internal combustion engine. Since the air cleaner 10 according to the embodiments of the present disclosure can improve space efficiency, it has high industrial utility value.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An air cleaner comprising: a first case having a case wall; a second case; and a flat plate filter element sandwiched between the first case and the second case, wherein the flat plate filter element has an annular sealing portion on a peripheral edge of the flat plate filter element, at least a partial section of a peripheral edge of the first case has a flange portion and a guide wall inside the case wall of the first case, the flange portion contacts the sealing portion, the flange portion extends inside the first case from an end of the case wall, substantially perpendicular to the case wall, in an extending direction of the flat plate filter element, the guide wall extends from an inner end of the flange portion, substantially parallel to the case wall, in a direction perpendicular to the extending direction of the flat plate filter element, and facing the case wall, and the case wall and the guide wall are connected to each other by a rib in the first case.

2. The air cleaner according to claim 1, wherein an outer shape of the sealing portion has a polygonal shape having a plurality of sides forming the polygonal shape when viewed along the direction perpendicular to the extending direction of the flat plate filter element, and the flange portion and the guide wall are provided across positions corresponding to at least one side and parts of two sides each adjacent to the one side, at the peripheral edge of the first case.

3. The air cleaner according to claim 1, wherein the peripheral edge of the first case has the flange portion and the guide wall over an entire circumference of the peripheral edge.

4. The air cleaner according to claim 1, wherein the first case includes a first divided body and a second divided body which are obtained by dividing the first case substantially parallel to the extending direction of the flat plate filter element.

5. The air cleaner according to claim 1, wherein a portion in which a width of the flange portion is larger than that of the sealing portion is provided in at least a partial section of the peripheral edge of the first case, and the flange portion includes a plurality of portions having different widths.

* * * * *